United States Patent

Sukegawa et al.

[11] 4,246,396
[45] Jan. 20, 1981

[54] PROCESS FOR PRODUCING POLYOXYMETHYLENE

[75] Inventors: Ikuo Sukegawa, Yokohama; Seiichi Nozawa, Yamato; Seiichi Mukai; Masaharu Shikama, both of Kawasaki, all of Japan

[73] Assignee: Mitsubishi Chemical Industries, Limited, Tokyo, Japan

[21] Appl. No.: 90,472

[22] Filed: Nov. 1, 1979

[30] Foreign Application Priority Data

Nov. 13, 1978 [JP] Japan .................. 53-139636

[51] Int. Cl.$^3$ .............................. C08G 2/08
[52] U.S. Cl. .................. 528/238; 525/398; 528/242; 528/243; 260/45.7 R; 260/45.7 P; 260/45.75 R
[58] Field of Search ............ 528/238, 242, 243; 260/45.7 R, 45.7 P, 45.75 R; 525/398

[56] References Cited

U.S. PATENT DOCUMENTS

| | | | |
|---|---|---|---|
| 3,278,635 | 10/1966 | Bastian | 528/238 X |
| 3,347,831 | 10/1967 | Naro et al. | 528/238 X |
| 3,349,044 | 10/1967 | Spitzer | 528/238 X |
| 4,158,729 | 6/1979 | Kimura et al. | 528/238 |

*Primary Examiner*—Lucille M. Phynes
*Attorney, Agent, or Firm*—Oblon, Fisher, Spivak, McClelland & Maier

[57] ABSTRACT

Polyoxymethylene having high molecular weight and high thermal stability is produced by polymerizing formaldehyde in the presence of a specific catalyst and then heating the resulting polyoxymethylene. The specific catalyst is produced by contacting a phosphorus containing compound or an amine (c) with a reaction product obtained by reacting salicylic acid component (b) with an organoaluminum compound (a) having the formula

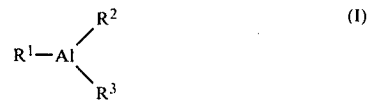

wherein $R^1$ represents an alkyl or alkoxyl group and $R^2$ and $R^3$ respectively represent alkyl or alkoxyl group or a halogen atom.

7 Claims, No Drawings

PROCESS FOR PRODUCING POLYOXYMETHYLENE

BACKGROUND OF THE INVENTION

1. Field of the Invention

The present invention relates to a process for producing polyoxymethylene. More particularly, it relates to a process for producing polyoxymethylene having high polymerization degree and high thermal stability by an advantageous industrial process.

2. Description of the Prior Arts

Polyoxymethylene have been used, as an engineering plastic, in various fields because of excellent mechanical characteristic.

However, a polyoxymethylene produced by polymerizing formaldehyde in the presence of the known catalyst has inferior thermal stability and it could not be used without a modification. Accordingly, the thermal stability of polyoxymethylene has been improved by an esterification or etherification of terminal hydroxyl groups of the polymer. In the method of improving thermal stability by modifying the terminal groups, a complicated step in which a large energy is consumed, should be employed after the polymerization and accordingly, it is not economical process.

The inventors have studied to overcome the disadvantages.

SUMMARY OF THE INVENTION

It is an object of the present invention to provide a process for producing a polyoxymethylene having high terminal stability by heat-melting a polyoxymethylene obtained by polymerizing formaldehyde in the presence of a specific aluminum compound.

The foregoing and other objects of the present invention have been attained by (1) polymerizing formaldehyde in the presence of a catalyst produced by contacting a phosphorus containing compound or an amine (c) with a reaction product obtained by reacting salicylic acid component (b) with an organoaluminum compound (a) having the formula

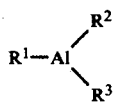     (I)

wherein $R^1$ represents an alkyl or alkoxyl group and $R^2$ and $R^3$ respectively represent alkyl or alkoxyl group or a halogen atom and then (2) heating the resulting polyoxymethylene, in the presence of a peroxide compound or a Lewis acid or in the absence of such an agent.

DETAILED DESCRIPTION OF THE PREFERRED EMBODIMENTS

Formaldehyde used as a starting material in the process of the present invention can be gaseous form or liquid form and substantially anhydrous formaldehyde having less than 1.0 wt. % of a water content especially less than 0.1 wt. % of a water content as the starting material for a conventional polymerization using a known catalyst.

The substantially anhydrous formaldehyde can be obtained by thermally decomposing paraformaldehyde in a high boiling point medium such as liquid paraffin and phthalic anhydride and passing the resulting formaldehyde gas through a column filled with a dehydration absorbent such as an ion-exchange resin. It is possible to add a small amount of a commonomer such as ethyleneoxide with formaldehyde as the starting material for the copolymerization.

In the process of the present invention, the polymerization should be carried out in the presence of a catalyst produced by contacting a phosphorus containing compound or an amine (c) with a reaction product obtained by reacting salicylic acid component (b) with an organoaluminum compound having the formula (I)(a).

The organoaluminum compounds having the formula (I)(a) used as one of the starting materials for the catalyst can be various known compounds.

The typical organoaluminum compounds are the following compounds having the formula (II)–(IV)

     (II)

wherein $R^4$ and $R^5$ respectively represent an alkyl group especially a lower alkyl group and l represents an integer of 1 to 3;

     (III)

wherein $R^6$ represents an alkyl group especially a lower alkyl group; X represents a halogen atom; and m represents 1 to 2

     (IV)

wherein $R^7$ represents an alkyl group especially a lower alkyl group; $X^2$ represents a halogen atom and n represents 1 to 3.

The organoaluminum compounds having the formula (II) include diethyl ethoxyaluminum, diisobutyl ethoxyaluminum, diisopropyl ethoxyaluminum, diisobutyl isobutoxyaluminum, isobutyl diethoxyaluminum, isobutyl diisobutoxyaluminum, n-propyl di-n-propoxyaluminum, di-n-propyl n-propoxyaluminum, triethoxyaluminum, triisopropoxyaluminum and tri-tert-butoxyaluminum. It is optimum to use triisopropoxyaluminum.

The organoaluminum compounds having the formula (III) include ethoxyaluminum dichloride, ethoxyaluminum dibromide, ethoxyaluminum diiodide, isobutoxyaluminum dichloride, diethoxyaluminum chloride, diethoxyaluminum bromide, diethoxyaluminum iodide, diisobutoxyaluminum chloride, di-n-propoxyaluminum chloride and n-propoxyaluminum dichloride.

These compounds can be obtained by oxidizing an corresponding organometal compound by the known method. For example, ethoxyaluminum dichloride can be obtained by oxidizing ethylaluminum dichloride in a solvent such as hexane with air.

The organoaluminum compounds having the formula (IV) include trialkyl aluminums such as triethyl aluminum, triisobutyl aluminum, tri-n-propyl aluminum, tri-n-butyl aluminum, tri-n-hexyl aluminum, tri-n-octyl aluminum and tri-n-decyl aluminum; and alkyl aluminum halides having the formula (IV) in which n is 1 to 2 such as diethylaluminum chloride, diethylaluminum bromide, diethylaluminum iodide, ethylaluminum dichloride, ethylaluminum dibromide, ethylaluminum diiodide, ethylaluminum sesquichloride, diisobutylaluminum chloride, isobutylaluminum dichloride, di-n-propylaluminum chloride and n-propylaluminum dichloride.

It is optimum to use the aluminum compound which has not a halogen atom among these compounds.

The salicylic acid component (b) which is reacted with the organoaluminum compound (a) include salicylic acid and salicylic acid derivatives having a substituent such an alkyl or aryl group or a halogen atom on its ring.

Suitable salicylic acid components include salicylic acid, 3-phenylsalicylic acid and 5-chlorosalicylic acid. It is optimum to use salicylic acid.

The structure of the reaction product obtained by reacting the organoaluminum compound (a) with the salicylic acid component (b) is not clearly found. According to infrared spectrography analysis, IR band for $$Al-O-C-\underset{O}{\overset{\|}{}}$$

is found. Thus, it is considered to form a coordination compound.

The catalyst used in the present invention is produced by contacting a phosphorus containing compound or an amine (c) with the reaction product obtained by reacting the organoaluminum compound (a) with the salicylic acid component (b).

The phosphorus containing compounds and the amines can be selected from known compounds.

The typical phosphorus compounds include the following compounds having the formula (V) or (VI).

$$R^8{}_3P \qquad (V)$$

wherein $R^8$ represents an alkyl, aryl, alkoxyl or aryloxyl group.

$$R^9{}_3P=O \qquad (VI)$$

wherein $R^9$ represents an alkyl, aryl, alkoxyl or aryloxyl group or $R^{10}R^{11}N$ group; and $R^{10}$ and $R^{11}$ respectively represent alkyl group.

The compounds having the formula (V) or (VI) can be the compound having a $C_1$-$C_{30}$ hydrocarbon moiety.

The compounds having the formula (V) include phosphines such as triphenylphosphine, tri-n-butylphosphine and triethylphosphine; and phosphites such as triphenylphosphite, tri-n-butylphosphite, trisnonylphenylphosphite, and tristearylphosphite.

The compounds having the formula (VI) include phosphates such as trimethylphosphate, and triphenylphosphate; phosphine oxide such as tri-n-butylphosphine oxide and triphenylphosphine oxide; and hexamethylphosphoric triamide. It is optimum to use hexamethylphosphoric triamide, triphenylphosphine, triphenylphosphite, tristearylphosphite, triphenylphosphate, tri-n-butylphosphite or tri-n-butylphosphate.

The typical amines include 1,8-diazabicyclo(5,4,0)undecen-7, bipyridyl, pyridine, ethylenediamine, propylenediamine, tri-n-butylamine and stearylamine. It is optimum to use 1,8-diazabicyclo(5,4,0)undecen-7.

The catalyst can be produced by a desired method in the present invention. For example, the organoaluminum compound (a) and the salicylic acid component (b) at a molar ratio of 1 to 5 preferably 1 to 2 based on the organoaluminum compound (a) are mixed in a solvent such as a hydrocarbon solvent e.g. n-hexane, n-heptane, benzene or toluene or an ether solvent e.g. ethyl ether, tetrahydrofuran at a temperature of from room temperature to 250° C. and then, the phosphorus-containing compound or the amine (c) is added to the resulting reaction product and mixed at a temperature of from room temperature to 200° C. Thus, the resulting catalyst mixture can be treated at higher than 50° C. especially higher than 80° C. after distilling off the solvent, if necessary.

The phosphorus containing compound or the amine is added at a molar ratio of 0.05 to 10 especially 0.3 to 3 based on the organoaluminum compound in the reaction mixture though it is depending upon the kind of the compound. For example, tristearylphosphite is added at a molar ratio of 0.25 to 3 and 1,8-diazabicyclo(5,4,0)undecene-7 is added at a molar ratio of 0.1 to 0.5.

An amount of the catalyst can be selected as desired and is usually in a range of 0.1 to $10^{-8}$ mole/liter preferably $10^{-4}$ to $10^{-7}$ mole/liter as the organoaluminum compound based on a volume of the liquid medium in the case of the liquid medium or based on a volume of a reactor in the case of a gas phase polymerization.

Various polymerization processes have been known and suitable processes can be employed. For example, it is possible to employ a slurry polymerization process wherein formaldehyde is dissolved in an inert solvent and the catalyst is added to the solution or gaseous formaldehyde is continuously fed into an inert solvent dispersing the catalyst; or a gas phase polymerization process wherein the catalyst dispersed in a medium is fed into a reactor and the medium is distilled off and gaseous formaldehyde is fed under stirring the catalyst.

Suitable inert solvents used for the slurry polymerization process include aliphatic hydrocarbons such as pentane, hexane, heptane and octane; alicyclic hydrocarbons such as cyclopentane, and cyclohexane; and aromatic hydrocarbons such as benzene, toluene and xylene. These solvents can be used as the inert medium for dispersing the catalyst. Accordingly, it is preferable to disperse the catalyst in the solvent and to feed the slurry into the reactor.

The polymerization is usually carried out at $-40°$ to $80°$ C. especially $0°$ to $40°$ C. under the pressure of the atmospheric pressure to 10 atm. especially the atmospheric pressure to 4 atm.

The resulting polyoxymethylene is treated by the heating step after separating the solvent, if necessary washing and drying in the case of the slurry polymerization.

The $R_{60}$ of the polyoxymethylene which is heated is preferably more than 85%. When $R_{60}$ is lower than 85%, the polyoxymethylene having satisfactorily high thermal stability may not be obtained by the heating treatment of the polyoxymethylene and the yield of the stabilized polymer is low to be uneconomical.

The heat treatment of the present invention can be carried out by the processes (1), (2) and (3).

(1) The process for heat-melting it for longer than 5 minutes.

(2) The process for heating it after admixing a peroxide.

(3) The process for heating it after admixing a Lewis acid.

The process (1) is firstly illustrated.

The heat-melting treatment can be carried out in an inert gas atmosphere such as nitrogen gas, argon gas or under a reduced pressure at a temperature of higher than the melting point of the polyoxymethylene and lower than 280° C. preferably 200° to 250° C. for a treating time of longer than 5 minutes preferably 10 to 60 minutes. These conditions are selected depending upon the kind of the catalyst, the polymerization condition and the temperature in the heat-melting treatment.

Thus, the object of the present invention can not be attained by the heat-melting for pelletizing the polyoxymethylene by extruding it through an extruder since the time is too short.

The heat-melting treatment is not always carried out with stirring, however a superior result can be expected by stirring it during the heat-melting treatment.

The typical apparatuses for the heat-melting treatment include uniaxial, biaxial or polyaxial extruder having a vent outlet or kneader type heat-melter or apparatuses having similar structure. It is necessary to design the apparatus to maintain the heat-melting for a desired time.

The process (2) will be illustrated.

When a peroxide is admixed with polyoxymethylene before the heat treatment, various known peroxides can be admixed.

Suitable peroxides are compounds having higher than 150° C. of a decomposition temperature in the case of 1 min. of a half value time which include t-butyl hydroperoxide, cumene hydroperoxide, 2,5-dimethylhexane-2,5-dihydroperoxide, 1,1,3,3-tetramethyl butyl hydroperoxide, 2,5-dimethyl-2,5-di(t-butylperoxy) hexine-3, p-menthane hydroperoxide, di-t-butyl peroxide, diisopropylbenzene hydroperoxide, t-butyl cumyl peroxide, 2,5-dimethyl-2,5-di(t-butyl peroxy) hexane, dicumyl peroxide, 1,4-bis(2-t-butylperoxyisopropyl) benzene, methyl ethyl ketone peroxide, di-t-butyl diperoxyisophthalate, n-butyl 4,4-bis(t-butylperoxy) valerate, t-butyl peroxybenzoate, 2,2-bis(t-butylperoxy)butane, t-butyl peroxyacetate, 2,5-dimethyl-2,5-di(benzoylperoxy) hexane, t-butyl peroxyisopropyl carbonate, cyclohexanone peroxide, t-butyl peroxy 3,5,5-trimethyl hexanoate, t-butyl peroxylaurate, t-butyl peroxymaleic acid and 1,1-bis(t-butyl peroxy) cyclohexane. It is especially preferable to admix cumene hydroperoxide, 1,1,3,3-tetramethyl butyl hydroperoxide, p-menthane hydroperoxide, diisopropyl benzene hydroperoxide or 1,4-bis(2-t-butyl peroxyisopropyl) benzene.

An amount of the peroxide is depending upon the kind of the catalyst used in the polymerization and is in a range of $10^{-9}$ to $10^{-3}$ mole per 1 g. of polyoxymethylene preferably $10^{-8}$ mole to $10^{-5}$ mole per 1 g. of polyoxymethylene.

In the slurry polymerization, the peroxide can be added to the solvent or to a wet cake obtained by a separation of the solvent, if necessary, after washing it or drying it or during the heat-treatment. Thus, it is the optimum to admix the peroxide with a wet cake. If necessary, polyoxymethylene can be heat-treated before admixing the peroxide.

The heat-treatment is usually carried out in an inert gas atmosphere such as nitrogen, argon or under a reduced pressure or an elevated pressure at 150° to 265° C. preferably at a melting point of polyoxymethylene to 255° C. A reaction time is in a range of 5 to 120 min. in the case of the temperature of 150° to 200° C. and is shorter than 30 min. in the case of higher than the melting point of polyoxymethylene. The reaction time is depending upon the kind of the catalyst, the condition of polymerization, and the temperature in the heat-treatment. The object of the present invention may be attained only for passing an extruder.

The apparatus suitable for the heat-treatment can be a reaction vessel in the case of the heat-treatment in a solvent at 150° C. to lower than a melting point of polyoxymethylene and it can be a fluidized bed in the case of the heat-treatment after drying.

When the heat-treatment is carried out at higher than the melting point of polyoxymethylene it is preferable to use uniaxial, biaxial or polyaxial extruders having a bent or a kneader type heat-melter or apparatuses having similar mechanism.

The process (3) will be illustrated.

In the heat-treatment, a Lewis acid is admixed with polyoxymethylene. Various Lewis acids can be used for this purpose.

Suitable Lewis acids include boron trifluoride etherate, aluminum chloride, aluminum bromide, aluminum iodide, boron trichloride, boron tribromide, boron triiodide, stannous chloride, stannic chloride, ferrous chloride, ferric chloride, gallium trichloride, indium trichloride, bismuth trichloride, silicon tetrachloride, phosphorus trichloride, phosphorus pentachloride, zinc chloride, antimony trichloride, and antimony pentachloride. It is optimum to use boron trifluoride etherate.

An amount of the Lewis acid is depending upon a kind of the catalyst used in the polymerization and is in a range of $10^{-9}$ to $10^{-3}$ mole per 1 g. of polyoxymethylene preferably $10^{-7}$ to $10^{-5}$ mole per 1 g. of polyoxymethylene.

In the slurry polymerization, the Lewis acid can be added to the solvent or to a wet cake obtained by a separation of the solvent, if necessary, after washing it or drying it or during the heat-treatment. Thus, it is the optimum to admix the Lewis acid with a wet cake. If necessary, polyoxymethylene can be heat-treated before admixing the Lewis acid.

The heat-treatment is usually carried out in an inert gas atmosphere such as nitrogen, argon or under a reduced pressure or an elevated pressure at 30° to 260° C. preferably 40° to 100° C. It is possible to carry out at higher than a melting point of polyoxymethylene.

A reaction time is in a range of 5 to 120 min. in the case of the temperature of 40° to 100° C. and shorter than 30 min. in the case of the temperature lower than a melting point of polyoxymethylene. The reaction time is depending upon the kind of the catalyst, the condition of polymerization, and the temperature in the heat-treatment.

If desired, the peroxide can be added before completing the polymerization whereas the Lewis acid may be added after the polymerization. When the Lewis acid is used, it is preferable to carry out the heat-treatment in a swollen condition. The object of the present invention may be attained only for passing an extruder.

The apparatus suitable for the heat-treatment can be a reaction vessel in the case of the heat-treatment in a solvent at 30° C. to lower than a melting point of polyoxymethylene and it can be a fluidized bed in the case of the heat-treatment after drying.

When the heat-treatment is carried out at higher than the melting point of polyoxymethylene it is preferable to use uniaxial, biaxial or polyaxial extruders having a bent or a kneader type heat-melter or apparatuses having similar mechanism.

The present invention has been illustrated in detail. In accordance with the process of the present invention, the polyoxymethylene having high molecular weight and high thermal stability can be easily produced by a simple operation of heating the polyoxymethylene produced by using a special catalyst. Thus, it is remarkably advantageous an industrial process.

The invention will be further illustrated by certain examples and references which are provided for purposes of illustration only and are not intended to be limiting unless otherwise specified.

The $R_{60}$ (weight %) was measured as follows.

Polyoxymethylene was heated at 222° C. in nitrogen atmosphere for 60 minutes by a thermobalance and the weights of the sample before and after the heat treatment were measured. A ratio of the weight after the treatment to the weight before the treatment is calculated.

The viscosity ($\eta_{sp}/C$) of each polyoxymethylene was measured by dissolving the polyoxymethylene whose terminals were acetylated at 130° C. for 5 minutes in p-chlorophenol containing 2% of α-pinene and measuring the resulting 0.5 wt. % solution at 60° C. by Ubbelode's viscometer.

The yield of the stabilized polymer after the heating treatment was given by the equation:

$$\text{Yield of stabilized polymer (wt. \%)} = \frac{\text{Weight of polymer after treatment}}{\text{Weight of polymer before treatment}} \times 100$$

Preparations of Catalyst 1 to 7:

In a four necked glass flask, each organoaluminum compound (a) and each salicylic acid component (b) and each solvent shown in Table 1 were charged. The mixture was stirred in the condition shown in Table 1 to react them.

Each phosphorus containing compound or each amine (c) shown in Table 2 was added to the resulting reaction mixture (i)–(iii) and the mixture was stirred at 25° C. for 2 hours.

In Preparation No. 1 to 3 and 5 to 7, the solvent was distilled off and each catalyst was produced by heating in the condition shown in Table 2. In Preparation No. 4, the catalyst was not heat-treated.

TABLE 1

| Reaction | Organo-aluminum compound (a) | Salicylic acid component (b) | Solvent | Reaction condition Temperature (°C.) | Time (hour) |
|---|---|---|---|---|---|
| (i) | tri-isopropoxy-aluminum (0.408 g.) | salicylic acid (0.552 g.) | tetrahydrofuran (50 ml.) | 25 | 2 |
| (ii) | triethyl-aluminum (0.228 g.) | salicylic acid (0.552 g.) | benzene (100 ml.) | 25 | 2 |
| (iii) | tri-isopropoxy-aluminum (0.408 g.) | 3-phenyl salicylic acid (0.856 g.) | tetrahydrofuran (50 ml.) | 25 | 2 |

TABLE 2

| Prep. | Reaction product | P-compound or amine (c) | Solvent | Reaction condition Temperature (°C.) | Time (hour) |
|---|---|---|---|---|---|
| 1 | (i) (0.480 g.) | triphenyl-phosphite (0.124 g.) | tetrahydrofuran (50 ml.) | 100 | 2 |
| 2 | (i) (0.480 g.) | tristearyl-phosphite (1.115 g.) | tetrahydrofuran (50 ml.) | 150 | 2 |
| 3 | (i) (0.480 g.) | 1,8-diazabicyclo(5,4,0)undecen-7 (0.051 g.) | tetrahydrofuran (50 ml.) | 100 | 2 |
| 4 | (i) (0.480 g.) | ethylenediamine (0.079 g.) | tetrahydrofuran (50 ml.) | 25 | 2 |
| 5 | (ii) (0.390 g.) | tristearyl-phosphite (0.989 g.) | benzene (100 ml.) |  |  |
| 6 | (ii) (0.390 g.) | 1,8-diazabicyclo(5,4,0)undecen-7 (0.045 g.) | benzene (100 ml.) | 100 | 2 |
| 7 | (iii) (0.632 g.) | tristearyl-phosphite (1.031 g.) | tetrahydrofuran (50 ml.) | 150 | 2 |

EXAMPLES 1 to 24

In a 1 liter four necked glass flask, 700 ml. of hexane and each catalyst shown in Table 3 were charged. Formaldehyde gas which was substantially anhydrous form obtained by thermally decomposing paraformaldehyde at 120° to 130° C. suspended in liquid paraffin, was continuously fed at a rate of 0.5 g. per minutes with nitrogen as a carrier gas into the mixture to polymerize it in the condition shown in Table 3. The catalytic efficiency and the thermal stability ($R_{60}$) of the polyoxymethylene are shown in Table 3.

In a 200 ml. four necked glass flask, 3 g. of each dried polyoxymethylene, 100 ml. of acetic anhydride and 0.05 g. of sodium acetate were charged and the mixture was heated at 139° C. for 1.5 hours to react them, and the acetylated product was washed with acetone and with water and dried for one night. The viscosity $\eta_{sp}/C$ of the acetylated polyoxymethylene was measured. The results are shown in Table 3.

(Examples 1 to 7:)

In a small kneader, 10 g. of each powdery polyoxymethylene was charged and heat-melted in the condition shown in Table 3. The yields of the stabilized polyoxymethylene and the thermal stabilities ($R_{60}$) and the viscosities ($\eta_{sp}/C$) thereof are shown in Table 3.

(Examples 8 to 17:)

In a small kneader, 10 g. of polyoxymethylene obtained by the process of Example 1 and each kind and each quantity of the peroxide compounds shown in Table 4 were charged and mixed and the mixture was heat-treated in each condition shown in Table 4. The yields, stabilities ($R_{60}$) and $\eta_{sp}/C$ of the stabilized polyoxymethylenes after the treatment are shown in Table 4.

(Examples 18 to 24:)

In a 100 ml. round bottom flask, 2 g. of polyoxymethylene obtained by the process of Example 1 and 30 ml. of n-hexane as a medium and each amount of Lewis acid of $BF_3Et_2O$ were charged and the mixture was heat-treated in the swollen condition shown in Table 5 and the product was filtered and dried. The yields, stabilities ($R_{60}$) and $\eta_{sp}/C$ of stabilized polyoxymethylenes after the treatment are shown in Table 5.

TABLE 3

| Exp. | Cata- lyst Prep. No. | Condition of polymerization | | | Result of polymerization | | | |
|---|---|---|---|---|---|---|---|---|
| | | Amount of catalyst (g.) | Temper- ature (°C.) | Time (min.) | Yield (g.) | Catalyst efficiency (g./poly- mer/g. cat) | $R_{60}$ (wt. %) | $\eta_{sp}/C$ |
| 1 | 1 | 0.00182 | 5 | 100 | 17.5 | 9,600 | 86 | 2.8 |
| 2 | 2 | 0.00480 | 25 | 200 | 23.7 | 4,900 | 91 | 6.6 |
| 3 | 3 | 0.00160 | 25 | 210 | 23.0 | 14,400 | 87 | 5.4 |
| 4 | 4 | 0.00169 | 5 | 120 | 21.7 | 12,800 | 85 | 2.0 |
| 5 | 5 | 0.00467 | 25 | 200 | 24.8 | 5,300 | 89 | 5.6 |
| 6 | 6 | 0.00147 | 25 | 200 | 19.1 | 13,000 | 86 | 4.7 |
| 7 | 7 | 0.00540 | 0 | 130 | 22.2 | 4,100 | 85 | 2.8 |

| Example | Heat-melting | | Result of heat-melting | | |
|---|---|---|---|---|---|
| | Temperature (°C.) | Time (min.) | Yield of stabilized polymer (wt. %) | $R_{60}$ (wt. %) | $\eta_{sp}$ |
| 1 | 220 | 20 | 89 | 97 | 2.2 |
| 2 | 220 | 20 | 93 | 98 | 2.8 |
| 3 | 220 | 20 | 90 | 97 | 2.6 |
| 4 | 220 | 20 | 89 | 96 | 1.8 |
| 5 | 220 | 20 | 92 | 97 | 2.6 |
| 6 | 220 | 20 | 89 | 96 | 2.5 |
| 7 | 220 | 20 | 89 | 96 | 2.3 |

TABLE 4

| Example | 8 | 9 | 10 | 11 | 12 |
|---|---|---|---|---|---|
| Catalyst No. | 1 | 2 | 3 | 4 | 5 |
| Condition of Polymerization: | | | | | |
| Amount of catalyst(g) | 0.00182 | 0.00480 | 0.00160 | 0.00169 | 0.00467 |
| Temperature (°C.) | 5 | 25 | 25 | 5 | 25 |
| Time (min.) | 100 | 200 | 210 | 120 | 200 |
| Result of polymerization: | | | | | |
| Yield (g) | 17.5 | 23.7 | 23.0 | 21.7 | 24.8 |
| Catalytic coefficient (g.polymer/g.cat.) | 9,600 | 4,900 | 14,400 | 12,800 | 5,300 |
| $R_{60}$ (wt.%) | 86 | 91 | 87 | 85 | 89 |
| $\eta_{sp}/C$ | 2.8 | 6.6 | 5.4 | 2.0 | 5.6 |
| Condition of heat-treatment Peroxide: | | | | | |
| Amount of peroxide: (mole/g.polymer) | CuHPO ($4 \times 10^{-7}$) | PBPO ($9 \times 10^{-7}$) | PBPO ($8 \times 10^{-7}$) | CuHPO ($3 \times 10^{-7}$) | CuHPO ($8 \times 10^{-7}$) |
| Temperature (°C.) | 245 | 210 | 200 | 245 | 245 |
| Time (min.) | 10 | 10 | 10 | 10 | 10 |
| Result of heat-treatment: | | | | | |
| Yield of stabilized polymer | 90 | 98 | 96 | 89 | 91 |
| $\eta_{sp}/C$ | 1.6 | 1.7 | 1.7 | 1.6 | 1.7 |
| $R_{60}$ (wt. %) | 95 | 94 | 90 | 96 | 96 |
| Example | 13 | 14 | 15 | 16 | 17 |
| Catalyst No. | 6 | 7 | 2 | 2 | 2 |
| Condition of polymerization: | | | | | |
| Amount of catalyst(g) | 0.00147 | 0.00540 | 0.00480 | 0.00480 | 0.00480 |
| Temperature (°C.) | 25 | 0 | 25 | 25 | 25 |
| Time (min.) | 200 | 130 | 200 | 200 | 200 |
| Result of polymerization: | | | | | |
| Yield (g) | 19.1 | 22.2 | 23.7 | 23.7 | 23.7 |
| Catalytic coefficient (g.polymer/g.cat.) | 13,000 | 4,100 | 4,900 | 4,900 | 4,900 |
| $R_{60}$ (wt. %) | 86 | 85 | 91 | 91 | 91 |
| $\eta_{sp}/C$ | 4.7 | 2.8 | 6.6 | 6.6 | 6.6 |
| Condition of heat-treatment Peroxide: | | | | | |
| Amount of peroxide: (mole/g.polymer) | CuHPO ($7 \times 10^{-7}$) | CuHPO ($4 \times 10^{-7}$) | MHPO ($9 \times 10^{-7}$) | CuHPO ($9 \times 10^{-7}$) | PBHPO ($1.8 \times 10^{-6}$) |
| Temperature (°C.) | 245 | 245 | 220 | 245 | 200 |
| Time (min.) | 10 | 10 | 10 | 10 | 2 |
| Result of heat-treat- | | | | | |

TABLE 4-continued

| ment: | | | | | |
|---|---|---|---|---|---|
| Yield of stabilized polymer | 90 | 90 | 96 | 93 | 98 |
| $\eta_{sp}/C$ | 1.6 | 1.6 | 1.6 | 1.6 | 1.7 |
| $R_{60}$ (wt. %) | 96 | 95 | 95 | 97 | 93 |

Note:
CuHPO: cumene hydroperoxide
PBHPO: diisopropylbenzene peroxide
MHPO: p-menthane hydroperoxide

TABLE 5

| Example | 18 | 19 | 20 | 21 | 22 | 23 | 24 |
|---|---|---|---|---|---|---|---|
| Catalyst No. | 1 | 2 | 3 | 4 | 5 | 6 | 7 |
| Condition of polymerization: | | | | | | | |
| Amount of catalyst (g) | 0.00182 | 0.00480 | 0.00160 | 0.00169 | 0.00467 | 0.00147 | 0.00540 |
| Temperature (°C.) | 5 | 25 | 25 | 5 | 25 | 25 | 0 |
| Time (min.) | 100 | 200 | 210 | 120 | 200 | 200 | 130 |
| Result of polymerization: | | | | | | | |
| Yield (g) | 17.5 | 23.7 | 23.0 | 21.7 | 24.8 | 19.1 | 22.2 |
| Catalytic coefficient (g.polymer/g.cat.) | 9,600 | 4,900 | 14,400 | 12,800 | 5,300 | 13,000 | 4,100 |
| $R_{60}$ (wt. %) | 86 | 91 | 87 | 85 | 89 | 86 | 85 |
| $\eta_{sp}/C$ | 2.8 | 6.6 | 5.4 | 2.0 | 5.6 | 4.7 | 2.8 |
| Condition of heat-treatment Lewis acid: | | | | | | | |
| Amount of Lewis acid (mole/g.polymer) | $BF_3Et_2O$ ($1 \times 10^{-6}$) | $BF_3Et_2O$ ($3.5 \times 10^{-6}$) | $BF_3Et_2O$ ($3.5 \times 10^{-6}$) | $BF_3Et_2O$ ($7 \times 10^{-7}$) | $BF_3Et_2O$ ($3.5 \times 10^{-6}$) | $BF_3Et_2O$ ($3.0 \times 10^{-7}$) | $BF_3Et_2O$ ($1 \times 10-6$) |
| Temperature (°C.) | 68 | 68 | 68 | 68 | 68 | 68 | 68 |
| Time (min.) | 10 | 10 | 10 | 10 | 10 | 10 | 10 |
| Result of heat-treatment: | | | | | | | |
| Yield of stabilized polymer | 99 | 98 | 98 | 99 | 98 | 98 | 99 |
| $\eta_{sp}/C$ | 1.6 | 1.7 | 1.6 | 1.7 | 1.6 | 1.6 | 1.6 |
| $R_{60}$ (wt. %) | 87 | 91 | 88 | 86 | 90 | 87 | 86 |

We claim:

1. A process for producing polyoxymethylene which comprises (1) polymerizing formaldehyde in the presence of a catalyst produced by contacting a phosphorus containing compound or an amine (c) with a reaction product obtained by reacting salicylic acid component (b) with an organoaluminum compound (a) having the formula

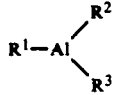

(I)

wherein $R^1$ represents an alkyl or alkoxyl group and $R^2$ and $R^3$ respectively represent alkyl or alkoxyl group or a halogen atom and then (2) heating the resulting polyoxymethylene.

2. A process according to claim 1 wherein a peroxide is incorporated in the polyoxymethylene before the heat-treatment.

3. A process according to claim 1 wherein a Lewis acid is incorporated in the polyoxymethylene before the heat-treatment.

4. A process according to claim 1 wherein the heat-treatment is carried out at higher than a melting point of polyoxymethylene and lower than 265° C. for longer than 5 minutes when a Lewis acid or a peroxide is not incorporated.

5. A process according to claim 2 wherein the heat-treatment is carried out at higher than a melting point of polyoxymethylene and lower than 280° C. for shorter than 30 minutes.

6. A process according to claim 2 wherein the heat-treatment is carried out at higher than 150° C. and lower than a melting point of polyoxymethylene for 5 to 120 minutes.

7. A process according to claim 3 wherein the heat-treatment is carried out at 30° to 260° C. for 5 to 120 minutes.

* * * * *